(12) United States Patent
Abakoumov et al.

(10) Patent No.: US 6,807,371 B1
(45) Date of Patent: Oct. 19, 2004

(54) RECONFIGURABLE ADD-DROP MULTIPLEXER

(75) Inventors: Dmitri M. Abakoumov, Lakemba (AU); Steven James Frisken, Randwick (AU)

(73) Assignee: Nortel Networks Limited, Eveleigh New South Wales (AU)

( * ) Notice: Subject to any disclaimer, the term of this patent is extended or adjusted under 35 U.S.C. 154(b) by 531 days.

(21) Appl. No.: 09/722,968

(22) Filed: Nov. 27, 2000

(51) Int. Cl.[7] .............................................. H04J 14/00
(52) U.S. Cl. ........................... 398/65; 359/497; 398/48
(58) Field of Search ............................ 398/48, 65, 152; 359/497, 498

(56) References Cited

U.S. PATENT DOCUMENTS 5,086,349 A * 2/1992 Okayama et al. ............. 398/48
6,005,697 A * 12/1999 Wu et al. ..................... 398/48
6,396,629 B1 * 5/2002 Cao ............................. 359/484
6,441,960 B1 * 8/2002 Wang et al. ................. 359/497

* cited by examiner

Primary Examiner—Hung N. Ngo
(74) Attorney, Agent, or Firm—Ladas & Parry

(57) ABSTRACT

An optical multiplexer device comprising: a first optical input channel; a second optical input channel; an optical output channel; a first series of polarization manipulation elements inconnected to the first and second input channel, the elements manipulating the polarization state of light emitted from either the first or second input channel; a wavelength selective filter adapted to transmit first predetermined wavelengths and reflect second predetermined wavelengths emitted from the first and second optical channel; a second series of polarization manipulation elements for manipulating the first predetermined wavelengths; wherein input light from the second optical input channel having third predetermined range of wavelengths is combined with light emitted from the first optical input channel at the optical output channel.

38 Claims, 10 Drawing Sheets

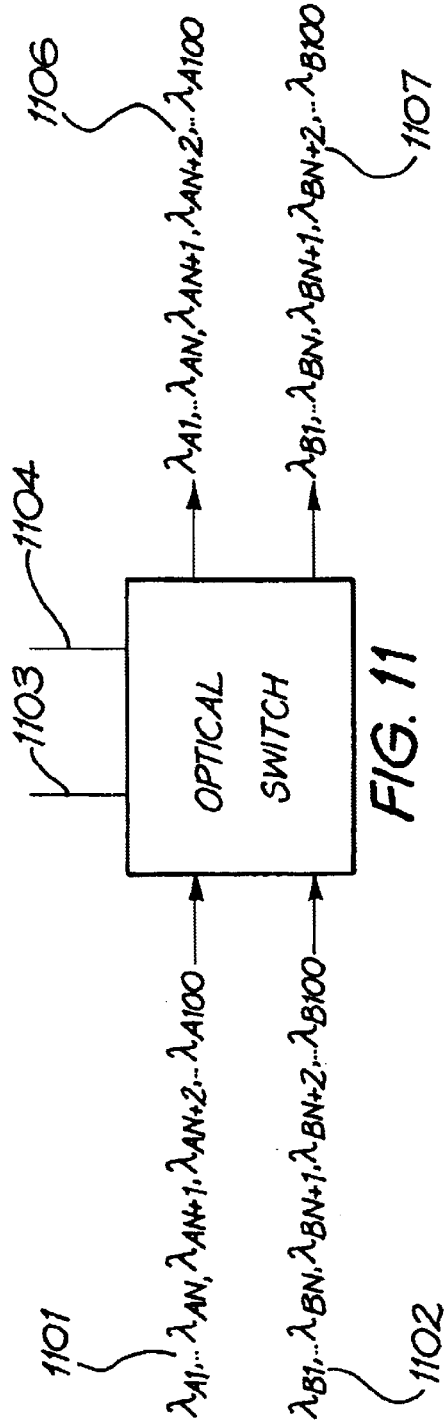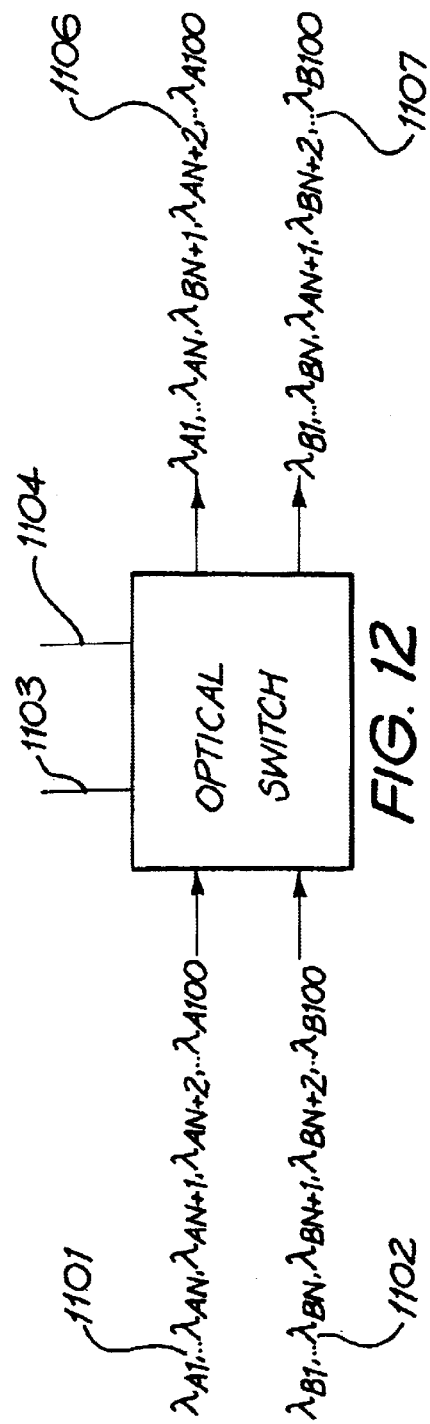

RECONFIGURABLE ADD-DROP MULTIPLEXER

FIELD OF THE INVENTION

The present invention relates to a reconfigurable add-drop multiplexers. The invention also relates to a wavelength dependent cross-connects.

BACKGROUND OF THE INVENTION

Significant increases in the bandwidth of an optical transmission system can be obtained by combining multiple signals of different wavelengths using wavelength division multiplexing (WDM). A key element in an optical network utilising wavelength division multiplexing is the so called "add-drop" multiplexer which performs the function of adding and removing signals from the main multiplexed signal.

Add-drop multiplexers are well known in the art, and usually include a series of input and output ports. In particular, there is provided an input port for inputting the original WDM signal, an output port for outputting the resultant WDM signal from any add or drop function performed by the multiplexer, an add port for adding a signal of a specific wavelength to the outgoing WDM signal, and a drop port for removing a signal of a particular wavelength from the incoming WDM signal.

As with any optical component, it is desirable to manufacture as compact and inexpensive a device as possible.

SUMMARY OF THE INVENTION

An object of the present invention is to provide for an improved form of add-drop multiplexer providing a high level of flexibility and compactness.

In accordance with a first aspect of the present invention, there is provided an optical multiplexer device comprising: a first optical input channel; a second optical input channel; an optical output channel; a first series of polarization manipulation elements inconnected to the first and second input channel, the elements manipulating the polarisation state of light emitted from either the first or second input channel; a wavelength selective filter adapted to transmit first predetermined wavelengths and reflect second predetermined wavelengths emitted from the first and second optical channel; a second series of polarization manipulation elements for manipulating the first predetermined wavelengths; wherein input light from the second optical input channel having third predetermined range of wavelengths is combined with light emitted from the first optical input channel at the optical output channel. Preferably, light from the first optical input channel having the third predetermined range of wavelengths can be separated from the light transmitted at the optical output channel.

The second series of polarization manipulation elements preferably can include a variable polarization manipulation element having at least two states, and when in the first state: input light from the first optical input channel having the third predetermined range of wavelengths can be separated from the light transmitted at the optical output channel and input light from the second optical input channel having the third predetermined range of wavelengths can be combined with light emitted from the first optical input channel at the optical output channel; and when in the second state: input light from the first optical input channel can be transmitted substantially unaffected to the optical output channel. The variable polarization element can comprise a Faraday rotator. Ideally, the light separated from the first optical input channel can be output at a second optical output channel.

Further, the device also preferably includes a first mirror device for reflecting light emitted from the second series of polarisation manipulation elements back through the second series series of polarisation manipulation elements and the, first series of polarisation manipulation elements and the reflected second predetermined wavelengths are preferably also subsequently transmitted through the first series of polarization elements.

The first optical input channel, the second optical input channel and the optical output channel can comprise spaced apart, adjacent optical fiber devices.

In accordance with a further aspect of the present invention, there is provided a method of adding and removing predetermined wavelengths to an input optical signal so as to produce an output optical signal, the method comprising the steps of: (a) initially separating orthogonal polarisation states of the input signal to produce a separated input signal; (b) filtering the separated input signal so as to extract the predetermined wavelengths from the input signal producing a filtered separated input signal; (c) combining a desired wavelength output signal spanning the predetermined wavelength range with the filtered separated input signal to produce a separated output signal; (d) combining the polarisation states of the separated output signal to produce an output signal; (e) emitting the output signal.

The step (b) further can comprise rotating the polarisation state of the predetermined wavelengths and the desired wavelength output signal, the rotation being one of at least two magnitudes and when at a first magnitude the method provides the functionality of an add-drop multiplexer.

In accordance with a further aspect of the present invention, there is provided an optical add drop multiplexer for adding or removing at least one optical signals from a plurality of multiplexed optical signals, each of the optical signals having a unique wavelength, the multiplexer including a first and second input ports for receiving at least one inputted optical signal, and a first and second output ports for outputting at least one optical signal, wherein the multiplexer additionally preferably can include, a plurality of reciprocal optical crystal elements, a wavelength sensitive mirror, a second mirror, a least one rotator element, between the wavelength sensitive mirror and the second mirror; wherein, optical signals not reflected by the wavelength sensitive mirror are transmitted through the wavelength sensitive mirror, thereby separating the optical signals into reflected optical signals and transmitted optical signals, and wherein the transmitted optical signals are reflected by the second mirror and recombined with the reflected optical signals before the being coupled into at least one of the outputs. Various devices utilising the multiplexer can also be constructed.

In accordance with a further aspect of the present invention, there is provided in a tunable add drop multiplexer comprising: an input port and an output port; at least one wavelength output port; a tunable wavelength selection unit having a first control input for selecting and separating a first range of wavelengths from a groups of wavelengths; a input/output mode operation unit including a spatial light translation means for spatially translating light input from the input port to at least two separate locations; a method of tuning the multiplexer to add or drop a particular range of wavelengths comprising the steps of: (a) activiating the input/output mode operation unit to translate light input from the input port to the output port; (b) tuning the wavelength selection unit to select a predetermined range of wavelengths; (c) reactiviating the input/output mode operation unit to translate light input from the input port to the wavelength selection unit with the wavelength selection unit extracting the predetermined range of wavelengths from the input light and forwarding the remaining wavelengths to the output port.

The input/output mode operation unit preferably can include a non-reciprocal light polarisation rotation element coupled with at least one polarisation sensitive spatial translation element and the activiating and reactivating steps can include setting the non-reciprocal light polarisation rotation element to at least two separate states of rotation so as to thereby cause the polarisation sensitive spatial translation element to translate the light to two separate spatial positions.

The two separate spatial postions can include a first fully reflective mirror surface and a second partially reflective mirror surface.

The wavelength selection unit preferably can include a mirror having controllable external wavelength filtering characteristics.

In accordance with a further aspect of the present invention, there is provided an add/drop multiplexor comprising: input and output ports; a first polarisation separation means for spatially separating polarisation states emitted from the input port; a polarisation alignment means for aligning the separated polarisation states so as to produce aligned polarisation states; a first reciprocal rotator for rotating the aligned polarisation states in a reciprocal manner to produce first rotated polarisation states; a non-reciprocal rotator for rotating the first rotated polarisation states in a non-reciprocal manner to a degree determined by an input control to produce second rotated polarisation states; a first focussing element for focusing the second rotated polarisation states; a second polarisation separation means for spatially translating predetermined portions of the second rotated polarisation states to produce translated polarisation states; a second reciprocal rotator for rotating the translated polarisation states in a reciprocal manner to produce third rotated polarisation states; a third polarisation separation means for spatially translating predetermined portions of the third rotated polarization states to produce second translated polarisation states; a reflective filtering element having a first surface area substantially reflecting all the second translated polarisation states and a second surface area substantially reflecting a first range of wavelengths whilst transmitting a second range of wavelengths; a second focussing element for focusing the second range of wavelengths; a second reciprocal rotator for rotating the aligned polarisation states in a reciprocal manner to produce fourth rotated polarisation states; a fourth polarisation separation means for spatially translating predetermined portions of the fourth rotated polarisation states to produce third translated polarisation states; a drop port and an add port for droping the second range of wavelengths at the drop port and adding the second range of wavelengths to the reflected first range of wavelengths at the output port.

In accordance with a further aspect of the present invention, there is provided an optical demultiplexer for separating at least one candidate wavelength division multiplexed channel from a series of other channels, the multiplexer comprising: an input and output waveguide; a third demultiplexing channel waveguide; a first bypass unit connected to the input waveguide and having a bypass control input and projecting light emitted from the input waveguide to one of at least two spatial positions depending on the state of the bypass control input; a filter unit located at a first one of the two spatial positions, the filter unit optically separating the candidate wavelength channel from the series of other channels and transmitting the series of other channels to the output waveguide; an output transmission unit located at a second one of the spatial positions and transmitting all of the series of channels to the output waveguide.

Preferably, the filter unit includes variable filter properties which can be varied in accordance with a filter control input so as to select different members of the series for outputting on the demultiplexing channel waveguide.

Ideally, the first bypass unit includes a polarisation rotation element interconnected to the bypass control input which rotates the light emitted from the input waveguide by an amount determined by the bypass control input.

Further, the first bypass unit can include a non reciprocal polarisation rotation element interconnected to the bypass control input and wherein the output transmission unit transmits the series of channels to the output waveguide through the non reciprocal polarisation rotation element. The output transmission unit can comprise a mirror for reflecting light transmitted through the first bypass unit back through the first bypass unit and towards the output waveguide. Ideally, the input and output waveguides are spaced adjacent one another and the filter unit can comprise a wavelength selective mirror.

In accordance with a further aspect of the present invention there is provided an optical multiplexer comprising for adding at least one candidate wavelength division multiplexed channel to a series of other channels, the multiplexer comprising: an input waveguide; a third multiplexing channel waveguide for inputting the at least one candidate wavelength division multiplexed channel; a first bypass unit connected to the input waveguide and having a bypass control input and projecting light emitted from the input waveguide to one of at least two spatial positions depending on the state of the bypass control input; a filter unit located at a first one of the two spatial positions, the filter unit optically combining the candidate wavelength channel from the third multiplexing channel with the series of other channels and transmitting the resulting series channels to one of at least two spatial position depending on the state of the bypass control input; and an output waveguide located at one of the at least two spatial positions.

In accordance with a further aspect of the present invention, there is provided an optical add and drop multiplexer for separating at from a series of other channels, whilst simultaneously adding at least one substitute candidate wavelength division multiplexed channel to the series of other channels to provide a resulting series of output channels, the multiplexer comprising: an input and output waveguide; a third add channel waveguide for inputting the at least one candidate wavelength division multiplexed channel; a fourth drop channel waveguide; a first bypass unit connected to the input waveguide and having a bypass control input and projecting light emitted from the input waveguide to one of at least two spatial positions depending on the state of the bypass control input; a filter unit located at a first one of the two spatial positions, the filter unit optically separating the candidate wavelength channel from the series of other channels and further combining the candidate wavelength channel from the third multiplexing channel with the series of other channels and transmitting the resulting series channels to one of at least two spatial

BRIEF DESCRIPTION OF THE DRAWINGS

Notwithstanding any of the forms which may fall within the scope of the present invention, preferred forms of the invention will now be described, by way of example only, with reference to the company drawings in which:

FIG. 11 and FIG. 12 illustrate schematically the utilisation of the first embodiment in an optical cross connect arrangement.

DETAILED DESCRIPTION OF THE EMBODIMENTS

In the first embodiment, an add-drop multiplexer having an operational state controlled by a switchable Faraday rotator is described.

Figure 1:
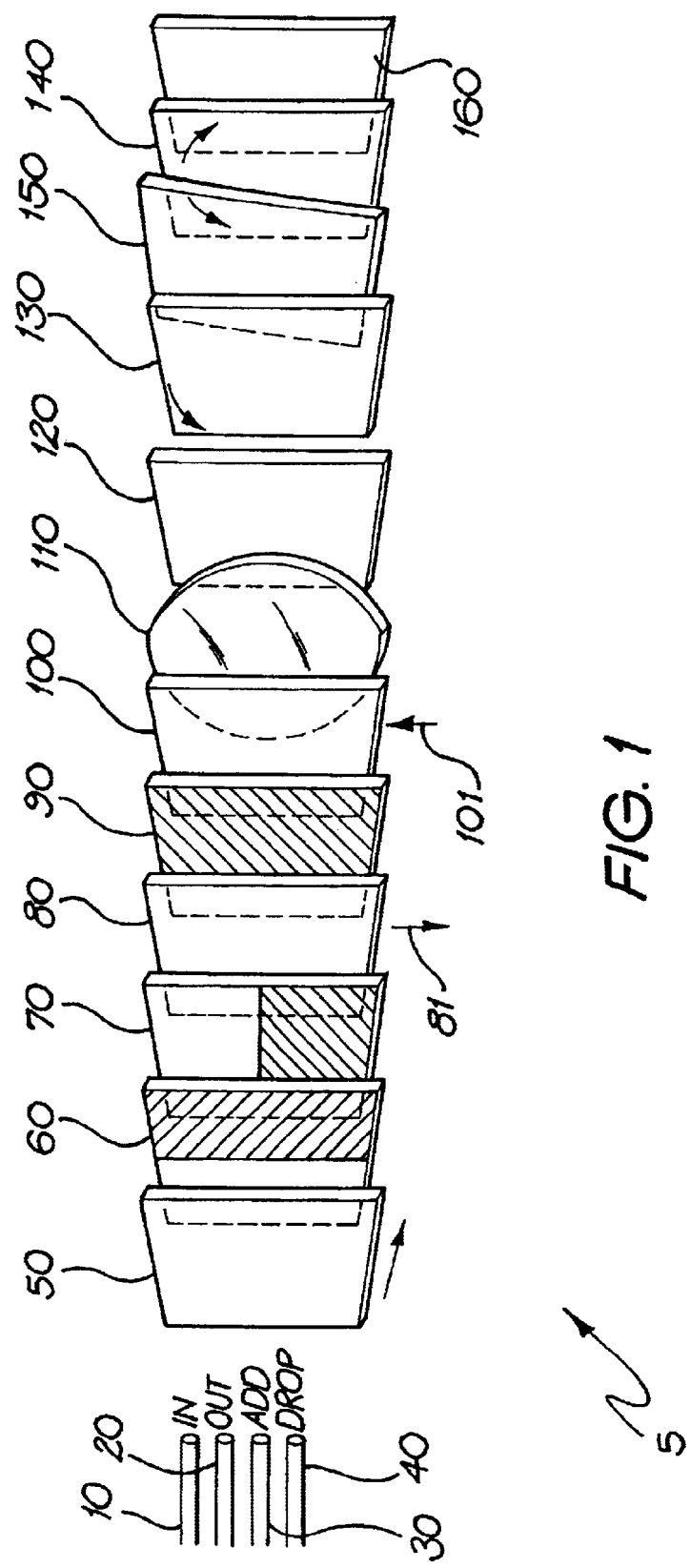
FIG. 1 illustrates schematically in exploded perspective an arrangement of an add-drop multiplexer in accordance with an embodiment of the invention.

Turning initially to FIG. 1, there is shown a first embodiment which includes an array of 4 single mode fibres 10, 20, 30, 40 which correspond to the input, output, add and drop ports of the multiplexer respectively. The fibres 10, 20, 30, 40 are approximately 125 microns in diameter and can include a short length of gradient index fibre attached to one end, or other form of mode expansion as will be known to a person skilled in the art. Preferably the four fibres are arranged in corresponding V grooves with approximately 127 microns spacing between the fibres.

The device proper consists of the following components:

1. A first walkoff crystal 50 is provided and can comprise a rutile crystal with a width of approximately 1 mm. The walkoff crystal 50 is positioned adjacent to the gradient indexed fibres 10, 20, 30, 40 and is of sufficient dimension to separate the polarisation states projected from the fibres.

2. Next, a first reciprocal rotator 60 is provided to achieve polarisation state equalisation of the fibres. The reciprocal rotator is placed to only affect some of the polarisation states of emitted beams 3. Next, a second reciprocal rotator 70 is provided to achieve additional 90° rotation of equalised polarisation states of light on the Add 30 and Drop 40 fibre paths only paths.

4. Next, a second walk-off plate 80 is provided to allow displacement in a polarisation dependant manner by a distance of 127 microns in the specified direction 81.

5. Next, a third reciprocal rotator 90 is provided to rotate all polarisation states by 90°.

6. Next, a third walk-off plate 100 is provided to allow displacement in a polarisation dependant manner by a distance of 127 microns in the direction 101 opposite to the second walk-off plate 80.

7. Next, a lens 110 can be gradient indexed lens of pitch such that an approximate formation of the fibre images is achieved.

8. Next, a dielectric bandpass filter/mirror 120 of desired bandwidth is positioned at a distance behind the lens 110 close to its focal plane. The bandpass filter/mirror reflects wavelengths outside a range of interest and transmits the wavelength of interest ($\lambda_d$).

In one modified embodiment, the bandpass filter/mirror 120 can be tunable. The tuneable mirror can comprise an Etalon and cavity length variable mirror or a multilayer dielectric filter with mechanically slidable tuning. An example suitable device is the OFT-20M/30M available from Santec Corporation of Japan.

9. Next, a first non-reciprocal rotator 130 of a fixed rotation direction is provided to rotate light 22.5°.

10. Next, a second non-reciprocal rotator 140 of a switchable rotation direction is provided to rotate Light 22.5°. It is separated from the first non-reciprocal rotator 130 by a spacer 150, that also can he a second dielectric bandpass filter designed to transmit the same band as the first one 120 but angled so as to suppress, at the same time, the building of Fabry-Perot type cavities for the reflected wavelengths (it was found in practice that such a spacer was often not necessary).

11. Finally, a reflective mirror surface 160 is positioned at a distance behind the lens approximately equally removed from its focal plane as the dielectric band pass filter 120.

The arrangement 5 shown in FIG. 1, can be used as an add-drop multiplexer by selecting an appropriate wavelength dependent transmission function for mirror 120 and filter 150, and by switching the direction of switchable Faraday rotator 140, depending on the desired functionality of the arrangement 5.

Figure 2:
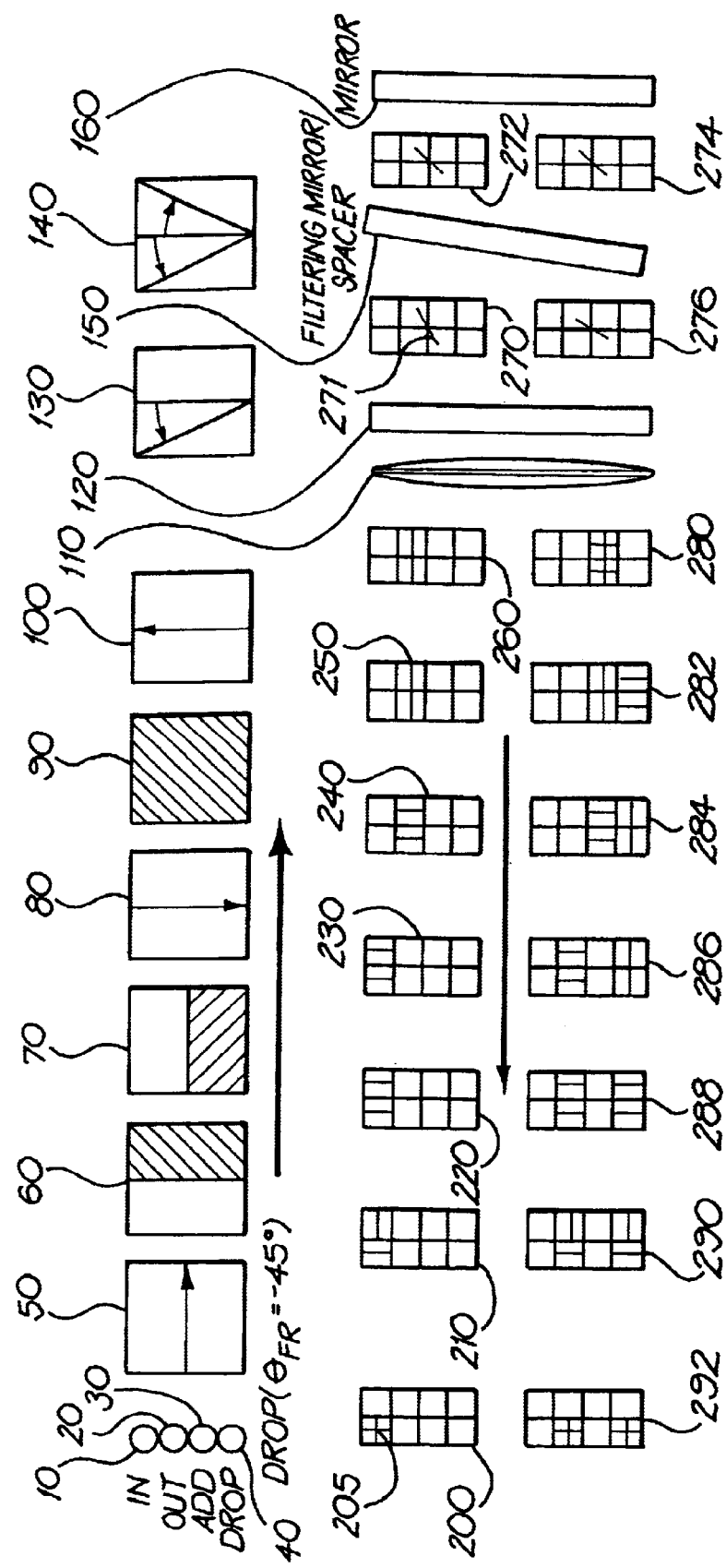
FIG. 2 shows a first series of polarisation state transition diagrams, corresponding to an embodiment of the invention dropping a wavelength from the WDM signal and transmitting the remaining wavelengths of the WDM signal to the output port.

Turning now to FIG. 2, there is shown an initial series of polarisation state transition diagram for the arrangement 5, adapted to provide transmission of the WDM signal from input port 10 to the output port 20 and to drop a signal of a predetermined wavelength via drop port 40.

Initially polarisation states 200 arc coincidental as indicated by cross 205. After traversing walk off plate 50 the polarisation states are spatially separated 210. The signals then pass through reciprocal rotator 60 which aligns the polarisation states 220. The next reciprocal rotator 70 produces no change in the polarisation states 230. After traversing walk off plate 80 the states are shifted to the output path 240. Next, the reciprocal rotator 90 produces a 90° rotation in the polarisation states 250. The following walk off plate 100 produces no shift in polarisation states 260.

The next elements to be traversed are the lens 110 and filtering mirror 120. The transmission characteristics of filtering mirror 120 can be chosen advantageously to provide a desired effect from the arrangement 5. In this embodiment the filtering mirror is transparent to the drop wavelength $\lambda_d$ (which is the same as the add wavelength $\lambda_a$). All other wavelengths are reflected by the filtering mirror 120.

The polarisation state diagrams 270, 272, 274, 276 show only a single polarisation state due to the fact that, until the light is again focused by lens 110 the light may be treated as if only a single polarisation state exists. In this case, as a drop operation is being performed, the only light transmitted through filtering mirror 120 is of wavelength $\lambda_d$. The light then traverses fixed Faraday rotator 130 to produce polarisation state 270, in which the polarisation of the light is rotated by 22.5°. Filtering mirror or spacer 150 produces no change on polarisation state of the light as it traverses this element.

The next element of the arrangement 5 to be traversed is switchable Faraday rotator 140. The direction of the 22.5° rotation produced by this Faraday rotator 140 can be altered in response to a magnetic field. The switchable Faraday rotator can be used to produce a rotation in the polarisation state of either 22.5° in the clockwise direction or 22.5° in the anticlockwise anti-clockwise direction. In this case the anti-clockwise direction is chosen later allow for the drop of the $\lambda_d$ wavelength. Thus, polarisation state 272 shows a further 22.5° rotation in -the polarization state. Mirror 120 produces a reflection of the light and no change in the polarisation state, as can be seen by diagram 274.

The switchable Faraday rotator is again traversed by the light on the return-path which produces a further 22.5° non-reciprocal rotation in the polarisation state, resulting in polarisation state 276. Next, the light again traverses fixed Faraday rotator 130 producing a vertically aligned polarisation state (not shown). $\lambda_d$ is then passed through filtering mirror 120 and lens 110 to produce polarisation state 280.

Polarisation state 280 shows 2 different sets of polarisation states for the reflected and transmitted wavelengths, that is, the wavelengths reflected by filtering mirror 120, which will be designated $\lambda_o$, and those wavelengths transmitted by the mirror 120, namely $\lambda_d$ as discussed above. Polarisation state 280 therefore consists of 2 black horizontal lines which represent the polarisation states of $\lambda_o$, and 2 vertical lines which represent the polarisation of $\lambda_d$.

Walk off plate 100 produces a downward shift in the $\lambda_d$ polarisation states achieving a spatial separation between the $\lambda_o$ and $\lambda_d$ wavelengths 282. Next, 90° reciprocal rotator 90 produces a 90° rotation in both $\lambda_d$ and $\lambda_o$ polarisation states 284. Then walk off plate 80 produces a further separation between the polarisation states by shifting the $\lambda_o$ polarisation into the output path of the multiplexer 286. Reciprocal rotator 70 produces a 90° rotation in the polarisation state of $\lambda_d$, as this rotator only affects wavelengths in the add and drop paths of the multiplexer 5. Thus, polarisation states 288 are produced, with aligned polarizations. Next the reciprocal rotator 60 produces a 90° rotation in the right hand side polarisation state only thereby producing polarisation state 290. The light then traverses walk off plate 50 producing a spatial shift in the horizontal polarisation states producing polarisation state 292.

It can be seen that polarisation state 292 corresponds to a situation in which light of wavelength $\lambda_d$ is coupled into the drop fibre of the multiplexer 5 and all other wavelengths $\lambda_o$ are coupled into the output fibre of the add-drop multiplexer 5.

Figure 3:
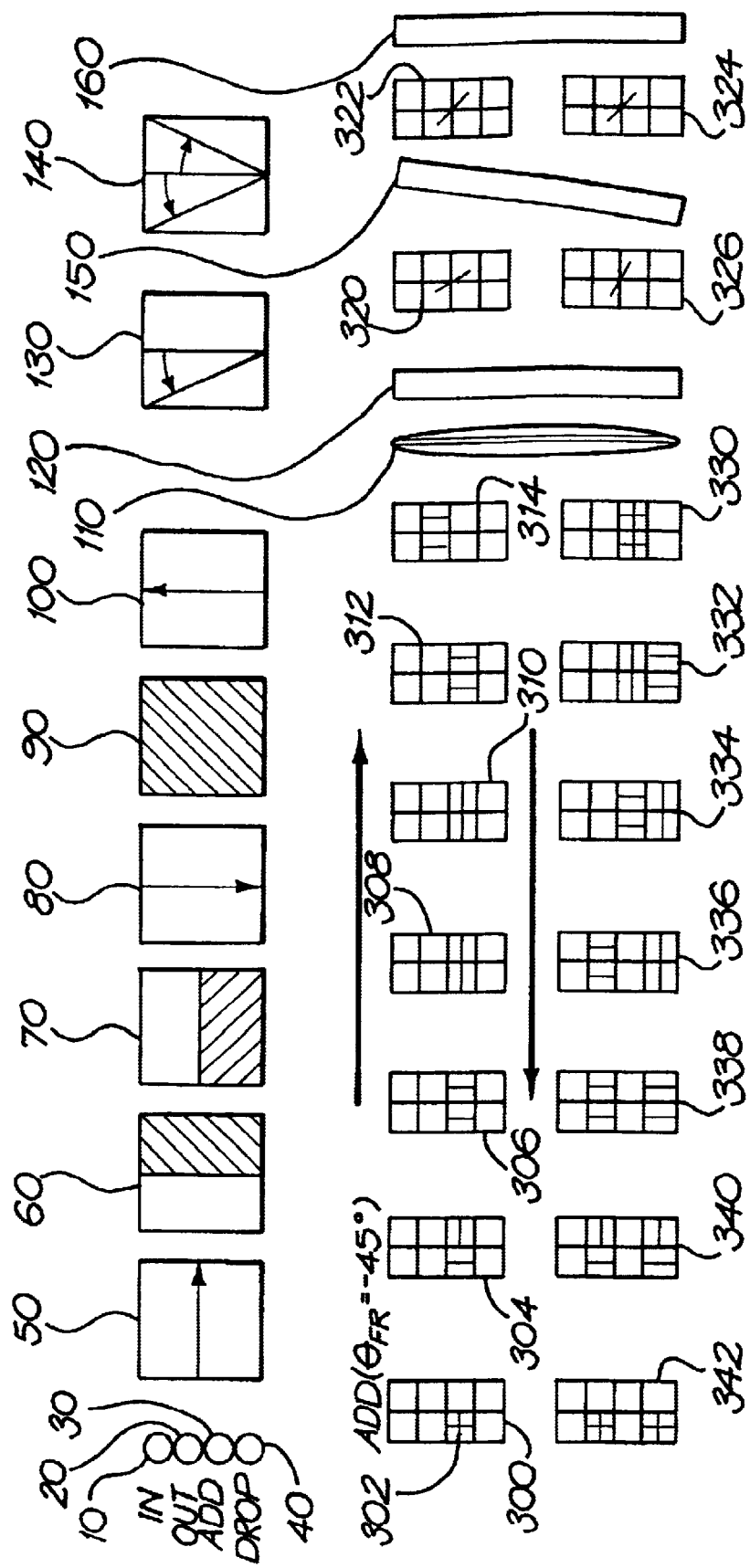
FIG. 3 illustrates a second series of polarisation state transition diagrams corresponding to an embodiment of the invention adding a wavelength to the WDM signal and transmitting the resulting signal to the output port.

Turning now to FIG. 3 there will now be described the add functionality of the add-drop multiplexer. That is, light is coupled from the add port 30 of the multiplexer 5 to the output port 20 of the multiplexer 5.

Light of wavelengths $\lambda_a$ (which is the same as $\lambda_d$) is coupled into the add port 30 of add-drop multiplexer 5 with the remaining wavelengths being coupled to the drop port 40. Initially, the add port input light comprises two orthogonal polarisation states 300, as represented by cross 302. Walk off plate 50 produces a spatial separation of the polarisation states of the light 304. Light then traverses reciprocal rotator 60, producing a 90° rotation in the right hand side polarisation state, thereby producing polarisation state 306. Next, reciprocal rotator 70 produces a 90° rotation of both polarisation states, resulting in polarisation state 308.

Walk off plate 80 has no effect on the polarisation states resulting in state 310. Next, reciprocal rotator 90 produces a 90° rotation in both polarisation states 312, and walk off plate 100 shifts both polarisation states spatially upward 314. As discussed with reference to FIG. 1, filtering mirror 120 is transparent to $\lambda_a$ wavelengths. Therefore, the signal is transmitted through lens 110 and through filtering mirror 120 retaining its polarization state 320. The other wavelengths are reflected to form part of the polarisation state 330. Again, as for FIG. 1, in the position 320 both polarisation states are shown as a single line until they are returned through lens 110. Fixed Faraday rotator 130 produces a 22.5° rotation in the polarisation states resulting in polarisation state 320. Next, filtering element 120 is traversed producing no change in the polarisation of the light. In order to couple a signal to the output port 20 of the arrangement 5 from the add port 30 the switchable Faraday rotator 140 is set to cause a 22.5° anti-clockwise rotation in incident light, thereby producing polarisation state 322. Mirror 160 produces no change in polarisation state 324.

The light again traverses switchable Faraday rotator 140 producing polarisation state 326 which has another 22.5° rotation imparted upon it. Fixed Faraday rotator 130 produces a further 22.5° anti-clockwise rotation in the polarisation state so as to produce a horizontal polarisation state which then is transmitted through filtering mirror 120 and lens 110 to produce polarisation state 330 which includes a horizontal polarisation state of the mirror transmitted wavelengths and a vertical polarisation state of the wavelengths initially reflected by mirror 120. Walk off plate 100 has no effect on the horizontal polarisation state whilst translating the vertical polarisation state 332. The light then traverses reciprocal rotator 90 producing a 90° rotation in polarisation states 334. Walk off plate 80 shifts one of the polarisation states spatially into the output path of the multiplexer whilst having no effect on the other polarisation state 336. The reciprocal rotator 70 is place to only affect the bottom polarization state resulting in polarisation state 338.

Next, reciprocal rotator 60 produces a 90° rotation in the right hand polarisation states resulting in polarisation states 340. Finally, walk off plate 50 spatially shifts the right hand polarisation state to the left in order to align the polarisation states for output producing polarisation state 342.

From the above description of polarisation state diagrams 300 to 342 it can be seen that light of wavelength $\lambda_a$ which is coupled into the add port 30 of the arrangement 5 is transmitted into the output port 20 thus providing the add function for the add-drop multiplexer 5. In turn, wavelengths outside of $\lambda_a$ are coupled from the add port to the drop port.

Figure 4:
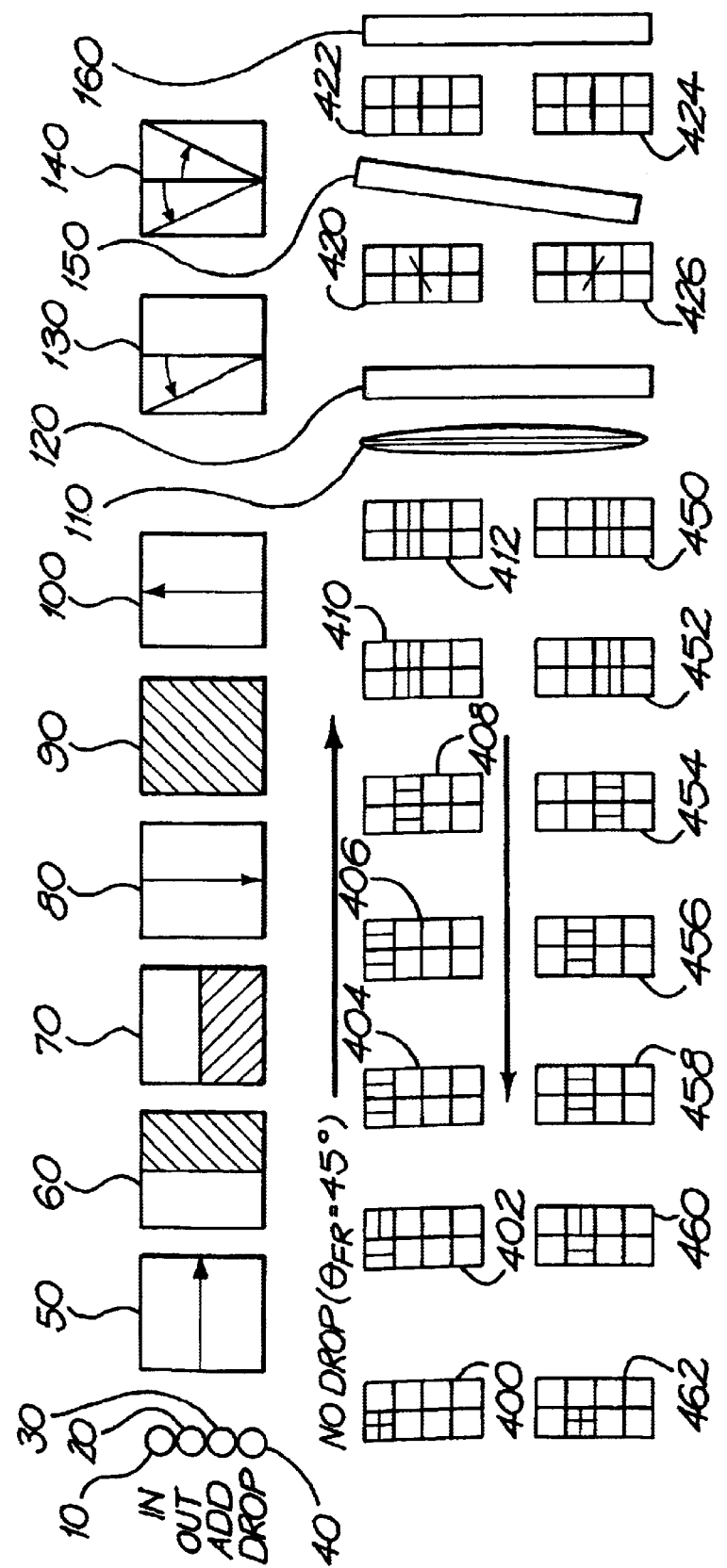
FIG. 4 shows another series of polarisation state transition diagrams for the device transmitting light from its input port to output port without performing an add or drop function.

Turning now to FIG. 4 there will now be described a so called "no drop" function of the add-drop multiplexer. A no drop function is essentially the direct path through the add-drop multiplexer from in port 10 or out port 20. All light of wavelengths light are coupled from the input port 10 to the output port 20.

Light of $\lambda_{1\ldots i}$, having orthogonal polarisation states 400 are coupled into the input port 10 of the arrangement 5. Walk off plate 50 produces a spatial separation of the polarisation states 402. Reciprocal rotator 60 rotates the right hand polarisation state so that it is parallel with the other 404. The second reciprocal rotator 70 has no effect on the polarisation states 406. The walk off plate 80 spatially shifts the polarisation states 408, and reciprocal rotator 90 rotates both states by 90° 410. Again, walk off plate 100 has no effect on the polarisation states 412.

As mirror 120 is transparent only to $\lambda_d$ (which is the same as $\lambda_a$) all other wavelengths are reflected producing polarisation state 450. However, $\lambda_d$ and $\lambda_a$ are transmitted through lens 110 and filtering mirror 120 to produce a polarisation state equivalent to state 412. The light is then transmitted through 22.5° by fixed Faraday rotator 130 producing polarisation state 420, which then passes through the filtering mirror/spacer and switchable Faraday rotator 140.

In order to allow the progression of all wavelengths through the multiplexer with no wavelength dropping being performed, the switchable Faraday rotator is set to produce a 22.5° clockwise rotation of any light transmitted through it, thus producing polarisation state 422. Polarisation state 422 is reflected from mirror 160 producing no change in polarisation 424. The light then again traverses switchable Faraday rotator 140 and is rotated by 22.5° in a clockwise direction, filtering mirror 150 has no effect on the polarisation and the resulting polarisation state will be as shown 426. Next the signals pass through fixed Faraday rotator 130 and filtering mirror 120 and lens 110 producing a polarisation state which is rotated 22.5° in an anti-clockwise direction with respect to polarisation state 426. This polarisation state of the transmitted rays, $\lambda_d$ and $\lambda_a$, is exactly aligned with polarisation state 450 that was produced by the wavelengths reflected by filtering mirror 120, thus resulting in one single polarisation state 450 for both the reflected and transmitted rays.

The light of polarisation state 450 then traverses walk off plate 100 with no effect 452. The polarisation is then rotated 90° by reciprocal rotator 90 producing polarization state 454, and then shifted spatially in the upward direction by walk off plate 80. Since the ray is then in the output path of the arrangement 5, the reciprocal rotator 70 produces no effect on the incident ray resulting in no change in the polarisation state 458. The right hand polarisation state is then rotated by 90° 460 by reciprocal rotator 60 and then spatially shifted to produce polarisation state 462 at the output port 20 of arrangement 5.

Thus it can be seen that with the switchable Faraday rotator 140 producing a 22.5° clockwise rotation, all of the wavelengths are transmitted directly from the input port 10 to the output port 20 of the arrangement 5, regardless of whether they are reflected ($\lambda_{1\ldots i}$) or transmitted ($\lambda_d$ and $\lambda_a$) by the filtering mirror 120.

Figure 5:
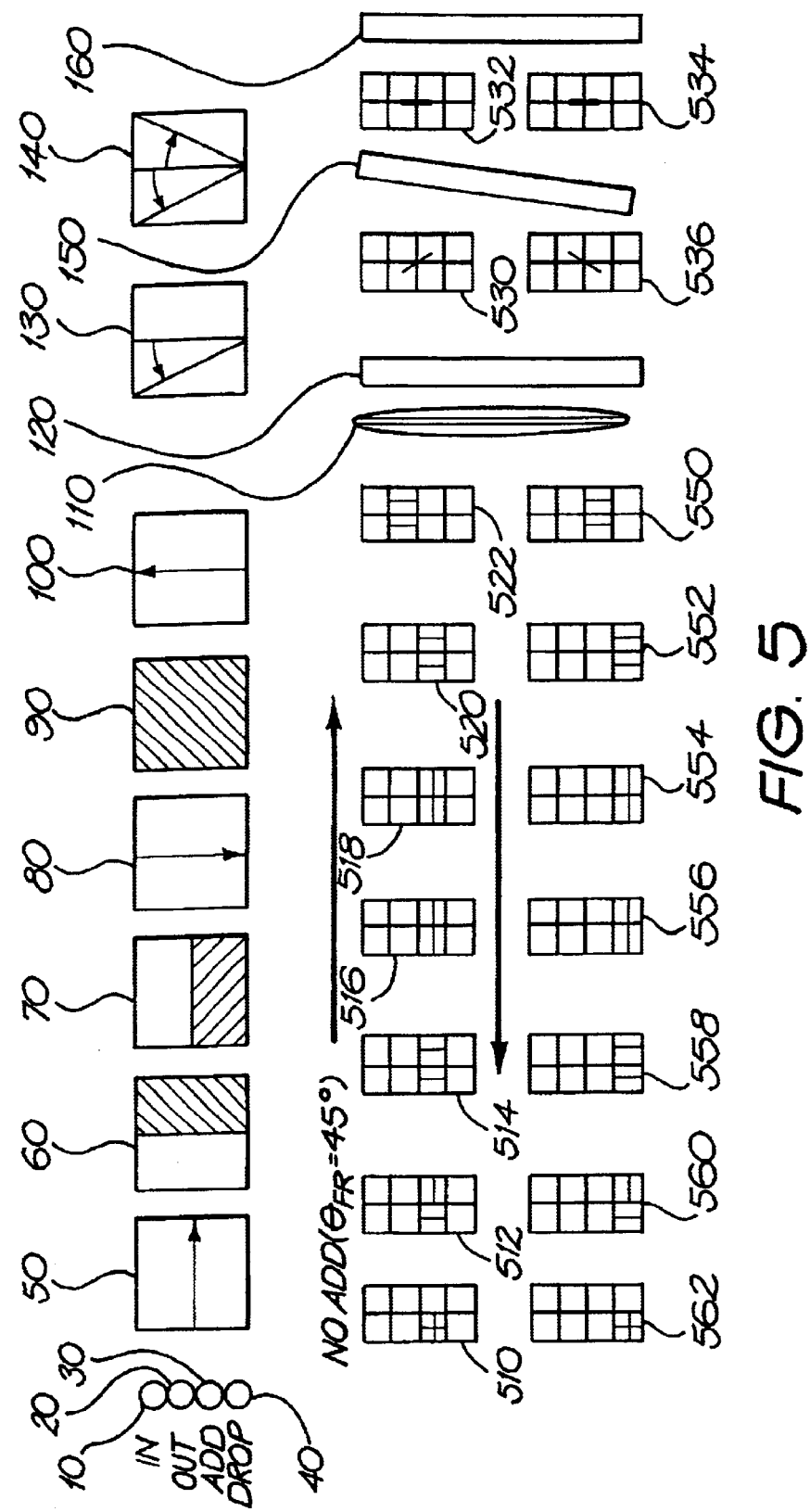
FIG. 5 shows a further series of polarisation state transition diagrams for a signal transmitted from the add port directly to the drop port of the device.

Turning now to FIG. 5, which show the polarization states for the "no add" function of the add-drop multiplexer 5. In the "no add" function, light of any wavelength may be added to the add port 30 of the arrangement 5 and is transmitted directly to the drop port 40 of the arrangement 5 without being added to the output signal.

As shown, light of two orthogonal polarisation states 510 is input into the arrangement 5 at the add port 30. This light then traverses walk off plate 50 producing a spatial separation in the two polarisation modes 512. The reciprocal rotator 60 then produces an alignment of the polarisation states 514 Since the light is in the add path of the arrangement 5 reciprocal rotator 70 produces a 90° rotation in the polarisation states 516. Walk off plate 80 as no effect on the polarisation states, and reciprocal rotator 90 rotates both polarisation states by 90° 520. Walk off plate 100 shifts the polarisation states into the output path of the arrangement 5 as shown by polarisation state 522.

At lens 110 and filtering mirror 120, some wavelengths of light will be reflected ($\lambda_{1\ldots i}$) and other wavelengths transmitted ($\lambda_d$ and $\lambda_a$ through filtering mirror 120. The reflected wavelengths produce polarisation state 550, whereas the transmitted wavelengths ($\lambda_d$ and $\lambda_a$) have no change in polarisation due to the lens and filtering mirror 120.

The transmitted rays then pass through fixed Faraday rotator 130 and acquire polarisation state 530. Filtering mirror/spacer 150 produces no change in the polarisation state of incident light and switchable Faraday rotator 140 produces a 22.5° rotation in the polarisation state in the clockwise direction 532. As in the case of the "no drop" feature of the arrangement 5 the switchable Faraday rotator 140 is set to produce a clockwise rotation in the polarisation state of any incident light.

Light exiting the switchable Faraday rotator 140 is then reflected by mirror 160 which produces no change in the polarisation state 534. This light again passes through the switchable Faraday rotator 140 and filtering mirror/spacer 150 producing new polarisation state 536. The light then traverses fixed Faraday rotator 130 filtering mirror 120 and lens 110 and becomes aligned with the polarisation state 550. Again, it can be seen that, the polarisation states of light transmitted through filtering mirror 120, coincides with the polarisation states of those wavelengths reflected by filtering mirror 120, to produce only 2 polarisation states 550.

The rays are then transmitted through walk off plate 100 which shifts the rays spatially downward into the drop path of the arrangement 5 as shown in diagram 552. The light is then rotated 90° by reciprocal rotator 90 into state 554. The walk off plate 80 produces no effect on the light as it traverses this element 556. Reciprocal rotator 70 rotates both polarisation states by 90° since they are in the drop path of the arrangement 5, resulting in polarisation state 558. The right hand polarisation state is rotated by 90° by reciprocal rotator 60, again achieving orthogonality of the polarisation states 560 The right hand polarisation state is then spatially shifted to coincide with the left hand polarisation state 562 by walk off plate 50.

Thus it can be seen that the arrangement when configured to produce "no add" transmits all wavelengths inserted into the add port 30 directly to the drop port 40 without any addition of wavelengths to the out port 20.

From the above discussion in relation to FIG. 2 to FIG. 5 the arrangement 5 provides all desired features of a reconfigurable add-drop multiplexer, namely:

dropping one wavelength of a series of input wavelengths, while transmitting all other wavelengths to the out port;

coupling a wavelength to the output port from the add port;

providing a direct path from input to output, without adding or dropping any wavelengths; and providing a direct path from add port to drop port of the multiplexer.

Figure 6:
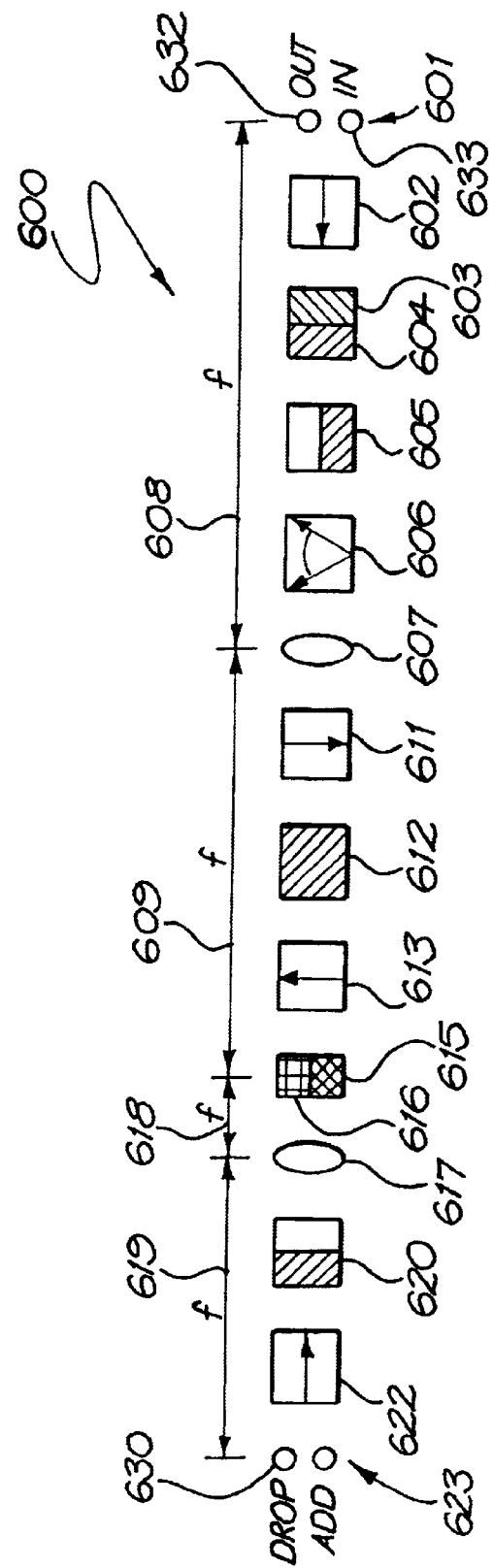
FIG. 6 illustrates schematically the arrangement of an alternative embodiment of the present invention.

Alternative embodiments are possible. Once such alternative embodiment, suitable for utilisation as a tunable add drop multiplexer will now be described. Turning initially to FIG. 6, there is illustrated schematically an alternative form of add drop multiplexer 600. The arrangement consists of the following components:

Input and output ports 601 for the input and output of signals. The input and output fibers 601 can include thermally expanded core ends.

Adjacent the fiber in 601 is a first walk off crystal 602 having a walk off orientation denoted by the associated arrow when traversing the element from left to right.

Next, a series of reciprocal rotators 603, 604 are provided for polarisation alignment operations.

Next, a optical element 605 is provided with a top section formed of clear glass and the bottom section 605 providing polarisation rotation of light propagating along the in path only.

Next, a variable Faraday rotator 600 is provided which provides for a non-reciprocal switchable rotation direction which can be alternated between −45° and +45°.

Next, a first focusing element 607 having focal lengths 608, 609 is provided for collimatingemitted light. The two focal lengths of the GRIN lens 607 being 608 and 609 respectively. It will be understood by those skilled in the art of design of optical system that the region between the two lenses 607, 617 operates in the Fourier domain and that the elements between the two lenses which provide for a polarisation state spatial translation only do not effect the angular state of the beams of light between the lenses. Hence the spatial state of beams of light between the lenses are somewhat decoupled from the spatial state of light outside of the two lenses 607,617.

Next, a second walk off place 611 is provided having a walk off direction as indicated when traversing from left to right.

A reciprocal rotator 612 rotates the polarisation states in a reciprocal manner by 90°.

A further walk off plate 613 provides a walk off of the same magnitude in the direction opposite to 611 indicated by the accompanying arrow.

Next, an optical element having a first fully reflective mirror 615 and a second tunable mirror 616 is provided. The tunable mirror being transparent at a particular wavelength. The tuneable mirror 616 can comprise a Etalon and cavity length variable mirror or a multilayer dielectric filter with mechanically slidable tuning. An example suitable device is the OFT-20M/30M available from Santec Corporation of Japan.

Next, a second lens-focusing element 617 having focal lengths 618, 619 preferably equal to 609, 608 is provided for focusing light.

Next, a further optical element 620 is provided having a clear glass element and a reciprocal rotating element.

Next, a further walk off plate 622 is provided for separating polarisation states. Each of the walk off elements 622 and 602 can comprise a rutile crystal with a width (approximately 1 millimeter) being sufficient to separate the polarisation state projected from corresponding fibers eg. 601, 623.

Next, there is provided fiber add and drop ports 623, 630 respectively.

Figure 7:
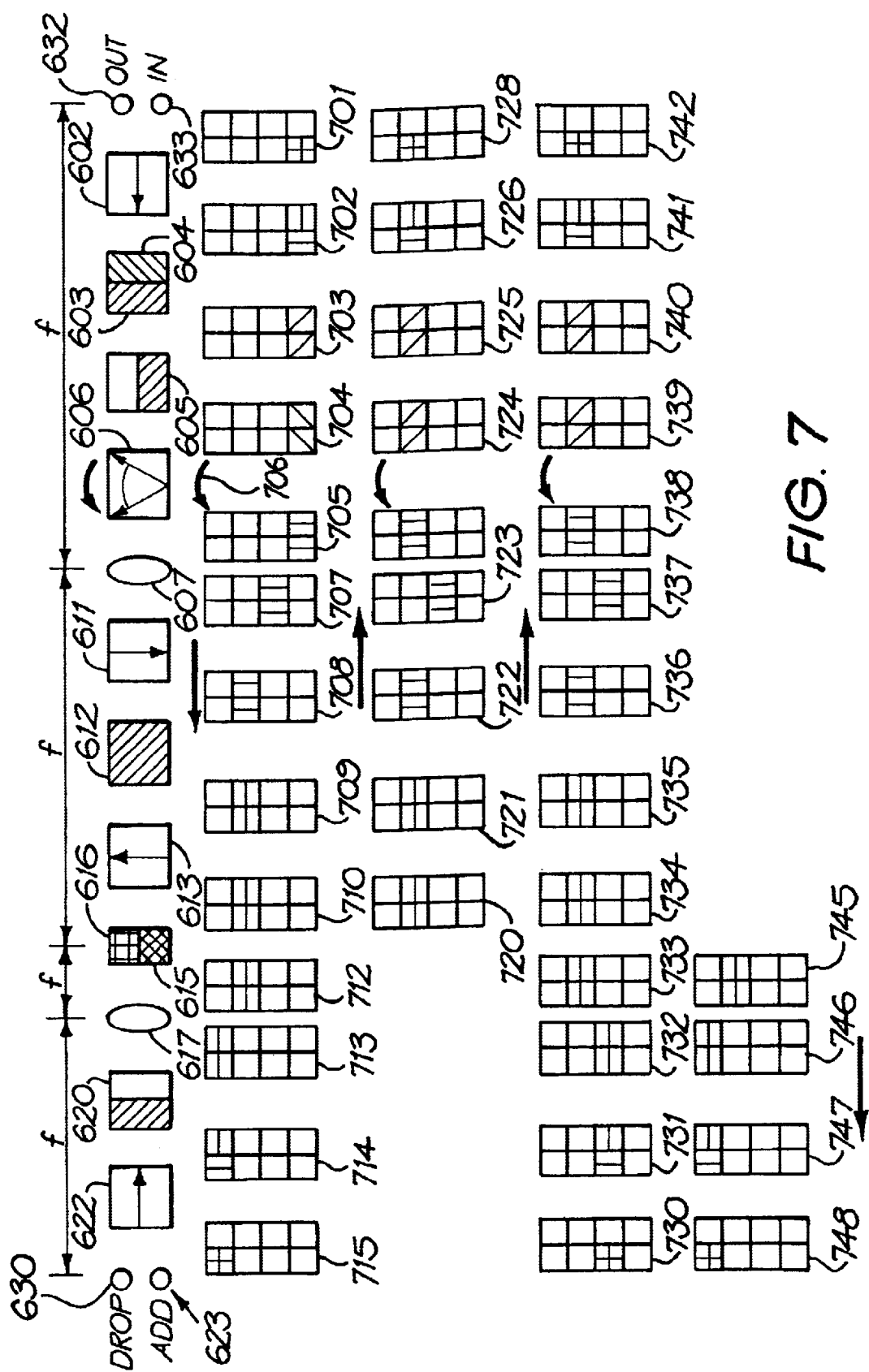
FIG. 7 illustrates a first series of polarisation state transitions for the arrangement of FIG. 6.

Turning now to FIG. 7, there is illustrated a first series of polarisation state transition diagrams for light emitted from the input port of the arrangement. Initially, the two polarisation states are spatially separated 702. The reciprocal rotators 603, 604 rotates the polarisation state by 45° in the opposite directions resulting in aligned polarisation states 703. The lower portion of optical element 605 results in a further 90° rotation of the polarisation state 704. The Faraday rotator 606 is set to provide a non-reciprocal rotation of polarisations in the direction 706. This results in a 45° rotation of the polarisation states 705. When turning from a space of objects to the space of images formed by lens 607 a decision has been made to formally position the light on the lens' axis, excluding the spatial translation of light due to its angular propagation relative to the axis from the spatial translations performed by subsequent elements (611, 613). The displacement of light in this space due to its angular propagation is formally included into the translation of polarisation state 707 compared to 705. The walk off elements 611 in turn translates the polarisation state 708. The reciprocal rotator 612 rotates the polarisation states by 90° 709. The walk off plate 613 has no effect on the polarisation state due to the ordinary axis being aligned with the walk off direction. The light is then transmitted to the top portion 616 of the dual surfaced mirror 616, 615. The mirror 616 is wavelength selective such that the selected wavelength is transmitted by the mirror. Suitable mirrors include those available from Santec Systems Inc. Again, light displacement due to angular propagation relative to the axis of lens 617 is taken into account by translation in the polarisation state 713. Subsequently, optical element 620 rotates one polarisation state by 90° whilst transmitting the other polarisation state thereby providing resulting polarisation state 714. The walk off crystal 622 results in an alignment 715 of the polarisation states at the output or drop port 630. Hence, for the selected wavelength of transparency of mirror 616, the light is transmitted from the input port 633 to the output port 630.

The wavelengths that are reflected by the mirror 616 are reflected with polarisation state 720. The polarisation element 613 has no effect of the polarisation state 721. The element 612 rotates the polarisation state by 90° 722 wherein after they are translated 723 by element 611. The inversion of the propagation angle during reflection from the mirror gives rise to the inverted light displacement on its way back to lens 607, which is formally shown by corresponding translation in the polarisation state. The Faraday rotator applies a non-reciprocal rotation to produce polarisation state 724 which bypass crystal element 605 and are rotated 726 before being aligned 728.

Further, the light emitted from the add port 730 is first separated 731 before being aligned 732. The lens element 717 provides the polarisation states 733. The wavelengths that are transparent to mirror 616 are transmitted through the mirror whilst maintaining their polarisation states. The element 613 has no effect on the polarisation state. The element 612 rotates the polarisation stated by 90° to produce polarisation state 736. The element 611 translates the polarisation state 737 and lens 607 produces polarisation state 738. Further, the polarisation states 739–742 are similar to that described previously (724–728) with the output from the add channel being polarisation aligned at the output port 632.

Those wavelengths that are reflected by the mirror 616 back towards ports 630, 623 initially maintain their polarisation state 745. The lens element 617 provides output polarisation state 746. Crystal element 620 rotates one of the polarisation states 747 before they are aligned by walk off plate 622 to produce polarisation state 748 which are output at the drop port.

It can therefore be seen from the series of polarisation states of FIG. 7 that when the Faraday rotator provides a 45° rotation in a counter clockwise direction, the wavelengths transparent to the mirror 616 are transmitted from the input port 633 to the drop port 630 with all other wavelengths being transmitted from the input port 633 to the output port 632. Further, wavelengths transmitted from the add port 623 and transmitted to the mirror 616 are transmitted also to the output port 632. As a result, the arrangement acts as an add-drop multiplexer.

Figure 8:
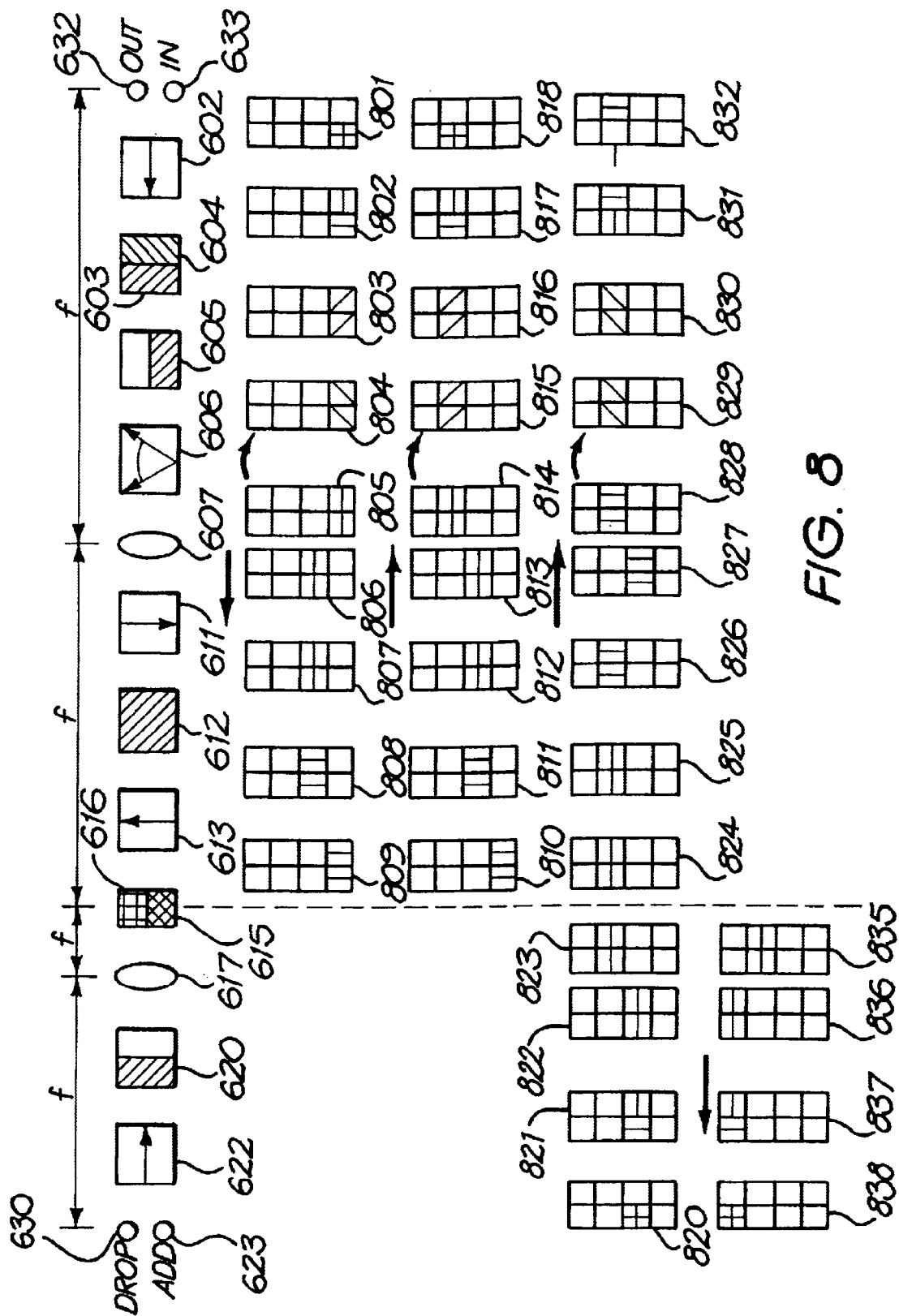
FIG. 8 illustrates a second series of polarisation state transitions for the arrangement of FIG. 6.

Turning now to FIG. 8, there is illustrated a series of polarisation state transitions for the case when the Faraday rotator element 606 has a 45° rotation in the clockwise direction.

Starting initially with light entering input port 633, the polarisation states are initially aligned 801. The walk off plate 602 separates the polarisation states 802. The reciprocal rotators 603, 604 rotate the polarisation states 803 so they are aligned.

Next, the reciprocal rotator 605 further rotates the polarisation state 804. The non-reciprocal Faraday rotator 606 applies a 45° rotation of the polarisation state so as to provide for polarisation states 805. The lens 607 provides the polarisation state 806. The walk off plate 611 has no affect on the polarisation state 807. The reciprocal rotator 612 results in a 90° rotation of the polarisation state 808. This is followed by a translation 809 of the polarisation state by walk off crystal 613. The light is then transmitted to the bottom portion 615 of the dual surfaced mirror 615, 616. The mirror 615 in turn reflects 810 the polarisation states, The walk off crystal 613 translates the polarisation state 811.

Next, they are rotated 812 by the reciprocal rotator 612. The walk off plate 611 has no affect on the polarisation states 813. The lens 607 results in output polarisation state 814. The non-reciprocal rotator 606 in turn rotates the polarisation state by 45° resulting in polarisation state 815.

Next, the reciprocal rotator 605 has no affect on the polarisation state they are transmitted above the reciprocal rotator 605. The reciprocal rotators 603, 604 result in rotations of the polarisation state 817.

Finally, the walk off plate 602 aligns the polarisation state 818. It can therefore be seen that the input polarisation state 801 is translated to the output polarization state 818.

Simultaneously, the light input at the add port 623 has initial polarisation state 820. The polarisation states are separated 821 by walk off plate 622.

Next, the reciprocal rotator 620 rotates one of the polarisation states to provide resulting polarisation state 822. The lens 617 provides a translation of polarisation state 823. Those polarisation states that are transparent to the mirrors 616 are transmitted through the mirror 824. The walk off plate 613 has no affect 825 on the polarisation states. Next, the reciprocal rotator 612 rotates the polarisation states 826. The walk off crystal 611 translates the polarisation state 827. The lens 607 provides output polarisation state 828.

Next, the Faraday rotator 606 applies a 45° rotation to the polarisation state 829. The element 605 does not affect the polarisation state 830. The two reciprocal rotators 603, 604 apply a polarisation rotation so as to rotate the polarisation state 831. The walk off plate 602 translates the polarisation stare 832.

As a result, light from the add port 623 is not transmitted to the output port 632 but is in effect isolated from this port.

The light which is reflected by the mirror 616 has a polarisation state 835. The lens 617 provides output polarisation states 836 which are in turn rotated 837 by optical element 620. The walk off plate 622 provides for an alignment of the polarisation state 838 at the drop port 630. As a result, the light is transmitted from the add port 623 to the drop port 630.

Figure 9:
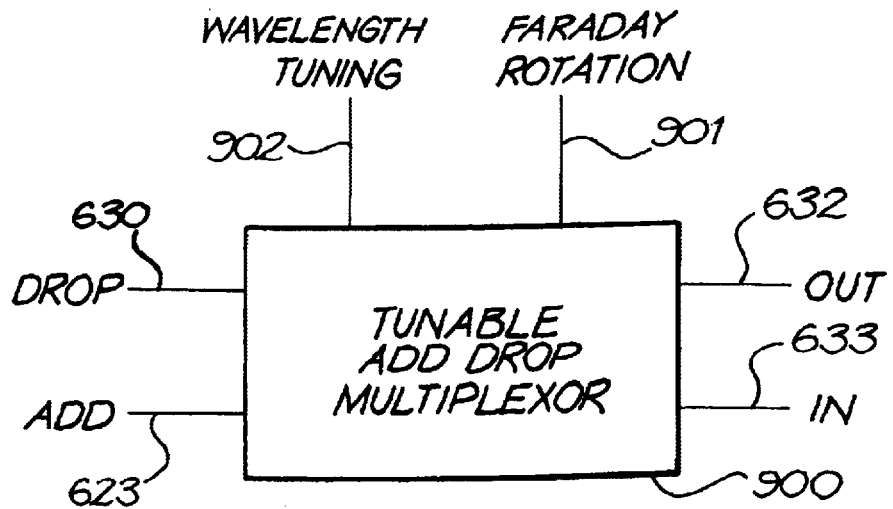
FIG. 9 illustrates the abstract functionality of the device of FIG. 6.

The arrangement of FIG. 6 has an advantageous mode of operation in that it allows for a tunable add drop multiplexer operation to be provided having two control inputs with one input being for the tuning of the wavelength and a second input being for the selection of add/drop operations. An operational arrangement can therefore be as illustrated in FIG. 9 wherein a tunable add drop multiplexer is provided 900 having input and output ports 633, 632 in addition to add and drop ports 623, 630. Two control inputs 901, 902 are provided. A first control input is utilised to provide a selectable degree of Faraday rotation (either +45 or −45) 901 and the second control input is provided for wavelength tuning of the mirror 616.

In order to tune the wavelength to be added or dropped, the Faraday rotator (606 of FIG. 8) is initally set to provide clockwise rotation as illustrated in FIG. 8 thereby transmitting all the input signal to the output signal. Next, the desired wavelength to be added or dropped is transmitted along the add port 623 and the mirror tuned until the desired wavelength condition is matched. Once tuned, the Faraday rotator input 901 can be switched so as to provide for a counterclockwise rotation of 45. Upon switching, the tuned wavelengths will be removed from the input line 633 and output on the drop port 630 with the add port 623 being added to the output signal 632. The arrangement of FIG. 9 therefore provides a significant advantage in that the multiplexer is a tunable multiplexer with the tuning taking place "offline" and therefore less likely to interfere or produce glitches on the input and output line signals.

Figure 10:
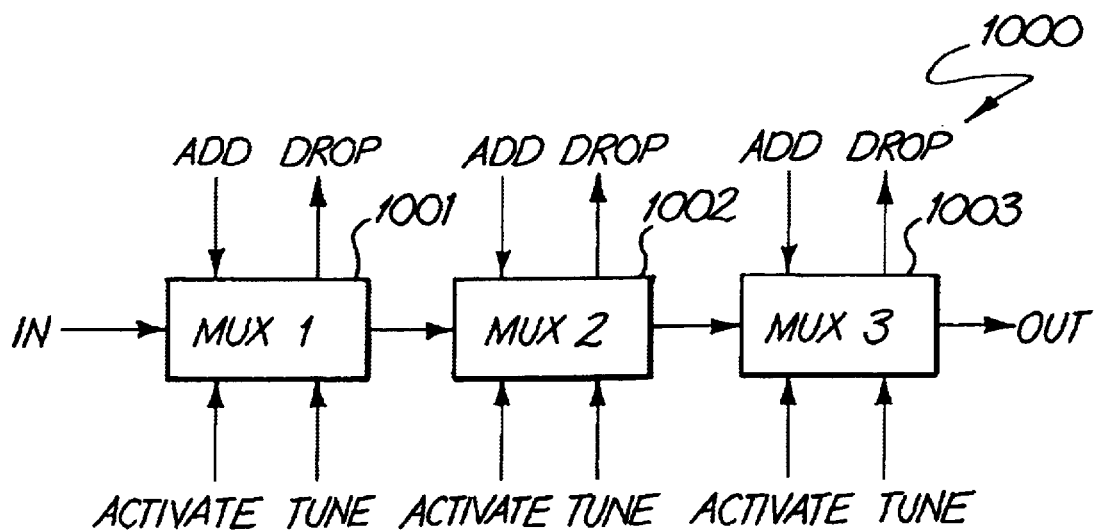
FIG. 10 illustrates the incorporation of the device of FIG. 6 into an optical communications system.

The arrangement of FIG. 9 can therefore be utilised in a communications system such as that showed schematically 1000 in FIG. 10. In this arrangement, a series of interconnected tunable multiplexers 1001–1003 are provided. An optical fibre input having multiple independant wavelength channels is also provided and each multiplexer acts to independantly add or drop channels utlising the techniques as aforementioned.

The arrangement of the first embodiment has an added advantage that it can be configured as an optical switch. Turning now to FIG. 11 and FIG. 12, such a reconfiguration is illustrated in schematic form 5. In this arrangement, a first series of input channels (say 100) are input 1101. These channels 1101, 1102, can be denoted $\lambda_{A1}, \ldots \lambda_{AN}, \lambda_{AN+1}, \lambda_{AN+2}, \ldots \lambda_{A100}$, and $\lambda_{B1}, \ldots \lambda_{BN}, \lambda_{BN+1}, \lambda_{BN+2}, \ldots \lambda_{B100}$. Further, the 'optical switch' includes two inputs 1103, 1104. The first input 1103 is utilised to determine the degree of Faraday rotation (either ±22.5°) and the second input 1104 is optional and is used to determine the wavelength of channels to be switched when a wavelength selective mirror, such as that aforementioned and available from Santec Systems Inc. is utilised. Normally, the device 5 operates to transmit each of the inputs on the in and add channel directly to the output 1106 and drop 1107 channel respectively. However, when the Faraday rotator is switched to its second state, the input channel wavelengths (e.g. $\lambda_{AN+1}$) selected as being transmitted by the wavelength selective mirror are transmitted to the drop channel 1107 to form output channels $\lambda_{B1}, \ldots \lambda_{BN}, \lambda_{AN+1}, \lambda_{BN+2}, \ldots \lambda_{B100}$ and the corresponding channel in the add channel 1102 (e.g. $\lambda_{BN+1}$,) is transmitted to the output channel 1106 to form output channels $\lambda_{A1}, \ldots \lambda_{AN}, \lambda_{BN+1}, \lambda_{AN+2}, \ldots \lambda_{A100}$. It will therefore be evident that the device 5 is able to act as a cross connect, switching channels under the control of an external signal with channel selection taking place via the switching of an alternative external signal.

It will be understood that the invention disclosed and defined herein extends to all alternative combinations of two or more of the individual features mentioned or evident from the text or drawings. All of these different combinations constitute various alternative aspects of the invention.

For example, in many cases the non-reciprocal Faraday rotator, such as that shown in FIG. 6 can be replaced with a reciprocal rotator with a suitable rearrangment of parts and the alignment thereof.

The foregoing describes embodiments of the present invention and modifications, obvious to those skilled in the art can be made thereto, without departing from the scope of the present invention.

We claim:

1. An optical multiplexer device comprising:
    a first optical input channel;
    a second optical input channel;
    an optical output channel;
    a first series of polarization manipulation elements inconnected to said first and second input channel, said elements manipulating the polarisation state of light emitted from either said first or second input channel;
    a wavelength selective filter adapted to transmit first predetermined wavelengths and reflect second predetermined wavelengths emitted from said first and second optical channel;
    a second series of polarization manipulation elements for manipulating said first predetermined wavelengths;
    wherein input light from said second optical input channel having third predetermined range of wavelengths is combined with light emitted from said first optical input channel at said optical output channel.

2. A device as claimed in claim 1 wherein light from said first optical input channel having said third predetermined range of wavelengths is separated from the light transmitted at said optical output channel.

3. A device as claimed in claim 2 wherein said third predetermined range of wavelengths is substantially the same as said second predetermined range of wavelengths.

4. A device as claimed in claim 1 wherein said second series of polarization manipulation elements includes a variable polarization manipulation element having at least two states,
    and when in said first state:
        input light from said first optical input channel having said third predetermined range of wavelengths is separated from the light transmitted at said optical output channel and input light from said second optical input channel having said third predetermined range of wavelengths is combined with light emitted from said first optical input channel at said optical output channel;
    and when in said second state:
        input light from said first optical input channel is transmitted substantially unaffected to said optical output channel.

5. A device as claimed in claim 4 wherein said variable polarization element comprises a Faraday rotator.

6. A device as claimed in claim 2 wherein said light separated from said first optical input channel is output at a second optical output channel.

7. A device as claimed in claim 1 further comprising:
    a first mirror device for reflecting light emitted from said second series of polarisation manipulation elements back through said second series series of polarisation manipulation elements and said first series of polarisation manipulation elements and said reflected second predetermined wavelengths are also subsequently transmitted through said first series of polarization elements.

8. A device as claimed in claim 5 wherein said first optical input channel, said second optical input channel and said optical output channel comprise spaced apart, adjacent optical fiber devices.

9. A method of adding and removing predetermined wavelengths to an input optical signal so as to produce an output optical signal, the method comprising the steps of:
    (a) initially separating orthogonal polarisation states of the input signal to produce a separated input signal;
    (b) filtering said separated input signal so as to extract said predetermined wavelengths from said input signal producing a filtered separated input signal;
    (c) combining a desired wavelength output signal spanning said predetermined wavelength range with said filtered separated input signal to produce a separated output signal;
    (d) combining the polarisation states of said separated output signal to produce an output signal;
    (e) emitting said output signal.

10. A method as claimed in claim 9 wherein said step (b) further comprises rotating the polarisation state of said predetermined wavelengths and said desired wavelength output signal, said rotation being one of at least two magnitudes and when al a first magnitude said method provides the functionality of an add-drop multiplexer.

11. In a tunable add drop multiplexer comprising:
    an input port and an output port;
    at least one wavelength output port;
    a tunable wavelength selection unit having a first control input for selecting and separating a first range of wavelengths from a groups of wavelengths;
    a input/output mode operation unit including a spatial light translation means for spatially translating light input from said input port to at least two separate locations;
    a method of tuning the multiplexer to add or drop a particular range of wavelengths comprising the steps of:
        (a) activiating said input/output mode operation unit to translate light input from said input port to said output port;
        (b) tuning said wavelength selection unit to select a predetermined range of wavelengths;
        (c) reactiviating said input/output mode operation unit to translate light input from said input port to said wavelength selection unit with said wavelength selection unit extracting said predetermined range of wavelengths from said input light and forwarding the remaining wavelengths to said output port.

12. A method as claimed in claim 11 wherein said input/output mode operation unit includes a light polarisation rotation element coupled with at least one polarisation sensitive spatial translation element and said activiating and reactivating steps include setting light polarisation rotation element to at least two separate States of rotation so as to thereby cause said polarisation sensitive spatial translation element to translate said light to two separate spatial positions.

13. A method as claimed in claim 11 wherein at said two separate spatial postions there included a first fully reflective mirror surface and a second partially reflective mirror surface.

14. A method as claimed in claim 11 wherein said wavelength selection unit includes a mirror having controllable external wavelength filtering characteristics.

15. An add/drop multiplexor comprising:
input and output ports;
a first polarisation separation means for spatially separating polarisation states emitted from said input port;
a polarisation alignment means for aligning said separated polarisation states so as to produce aligned polarisation states;
a first reciprocal rotator for rotating said aligned polarisation states in a reciprocal manner to produce first rotated polarisation states;
a non-reciprocal rotator for rotating said first rotated polarisation states in a non-reciprocal manner to a degree determined by an input control to produce second rotated polarisation states;
a first focussing element for focusing the second rotated polarisation states;
a second polarisation separation means for spatially translating predetermined portions of said second rotated polarisation states to produce translated polarisation states;
a second reciprocal rotator for rotating said translated polarisation states in a reciprocal manner to produce third rotated polarisation states;
a third polarisation separation means for spatially translating predetermined portions of said third rotated polarisation states to produce second translated polarisation states;
a reflective filtering element having a first surface area substantially reflecting all said second translated polarisation states and a second surface area substantially reflecting a first range of wavelengths whilst transmitting a second range of wavelengths;
a second focussing element for focusing the second range of wavelengths;
a second reciprocal rotator for rotating said aligned polarisation states in a reciprocal manner to produce fourth rotated polarisation states;
a fourth polarisation separation means for spatially translating predetermined portions of said fourth rotated polarisation states to produce third translated polarisation states;
a drop port and an add port for droping said second range of wavelengths at said drop port and adding said second range of wavelengths to said reflected first range of wavelengths at said output port.

16. An optical demultiplexer for separating at least one candidate wavelength division multiplexed channel from a series of other channels, said multiplexer comprising:
an input and output waveguide;
a third demultiplexing channel waveguide;
a first bypass unit connected to said input waveguide and having a bypass control input and projecting light emitted from said input waveguide to one of at least two spatial positions depending on the state of said bypass control input;
a filter unit located at a first one of said two spatial positions, said filter unit optically separating said candidate wavelength channel from said series of other channels and transmitting said series of other channels to said output waveguide;
an output transmission unit located at a second one of said spatial positions and transmitting all of said series of channels to said output waveguide.

17. An optical demultiplexer as claimed in claim 16 wherein said filter unit includes variable filter properties which can be varied in accordance with a filter control input so as to select different members of said series for outputting on said demultiplexing channel waveguide.

18. An optical demultiplexer as claimed in claim 16 wherein said first bypass unit includes a polarisation rotation element interconnected to said bypass control input which rotates the light emitted from said input waveguide by an amount determined by said bypass control input.

19. An optical demultiplexer as claimed in claim 16 wherein said first bypass unit includes a non reciprocal polarisation rotation element interconnected to said bypass control input and wherein said output transmission unit transmits said series of channels to said output waveguide through said non reciprocal polarisation rotation element.

20. An optical demultiplexer as claimed in claim 16 wherein said output transmission unit comprises a mirror for reflecting light transmitted through said first bypass unit back through said first bypass unit and towards said output waveguide.

21. An optical demultiplexer as claimed in claim 16 wherein said input and output waveguide are spaced adjacent one another.

22. An optical demultiplexer as claimed in claim 16 wherein said filter unit comprises a wavelength selective mirror.

23. An optical multiplexer comprising for adding at least one candidate wavelength division multiplexed channel to a series of other channels, said multiplexer comprising:
an input waveguide;
a third multiplexing channel waveguide for inputting said at least one candidate wavelength division multiplexed channel;
a first bypass unit connected to said input waveguide and having a bypass control input and projecting light emitted from said input waveguide to one of at least two spatial positions depending on the state of said bypass control input;
a filter unit located at a first one of said two spatial positions, said filter unit optically combining said candidate wavelength channel from said third multiplexing channel with said series of other channels and transmitting the resulting series channels to one of at least two spatial position depending on the state of said bypass control input; and
an output waveguide located at one of said at least two spatial positions.

24. An optical multiplexer as claimed in claim 23 wherein said filter unit includes variable filter properties which can be varied in accordance with a filter control input so as to select different member of said series for outputting on said demultiplexing channel waveguide.

25. An optical multiplexer as claimed in claim 23 wherein said first bypass unit includes a polarisation rotation element interconnected to said bypass control input which rotates the light emitted from said input waveguide by an amount determined by said bypass control input.

26. An optical multiplexer as claimed in claim 23 wherein said first bypass unit includes a non reciprocal polarisation rotation element interconnected to said bypass control input and wherein said output transmission unit transmits said series of channels to said output waveguide through said non reciprocal polarisation rotation element.

27. An optical multiplexer as claimed in claim 23 wherein said output transmission unit comprises a mirror for reflecting light transmitted through said first bypass unit back through said first bypass unit and towards said output waveguide.

28. An optical multiplexer as claimed in claim 23 wherein said input and output waveguide are spaced adjacent one another.

29. An optical multiplexer as claimed in claim 23 wherein said filter unit comprises a wavelength selective mirror.

30. An optical add and drop multiplexer for separating at from a series of other channels, whilst simultaneously adding at least one substitute candidate wavelength division multiplexed channel to said series of other channels to provide a resulting series of output channels, said multiplexer comprising:

an input and output waveguide;

a third add channel waveguide for inputting said at least one candidate wavelength division multiplexed channel;

a fourth drop channel waveguide;

a first bypass unit connected to said input waveguide and having a bypass control input and projecting light emitted from said input waveguide to one of at least two spatial positions depending on the state of said bypass control input;

a filter unit located at a first one of said two spatial positions, said filter unit optically separating said candidate wavelength channel from said series of other channels and further combining said candidate wavelength channel from said third multiplexing channel with said series of other channels and transmitting the resulting series channels to one of at least two spatial positions depending on the state of said bypass control input, with said output waveguide being located at one of said spatial positions;

an output transmission unit located at a second one of said spatial positions and transmitting all of said series of channels to said output waveguide.

31. An optical add and drop multiplexer as claimed in claim 30 wherein said filter unit includes variable filter properties which can be varied in accordance with a filter control input so as to select different members of said series for outputting on said demultiplexing channel waveguide.

32. An optical add and drop multiplexer as claimed in claim 30 wherein said first bypass unit includes a polarisation rotation element interconnected to said bypass control input which rotates the light emitted from said input waveguide by an amount determined by said bypass control input.

33. An optical add and drop multiplexer as claimed in claim 30 wherein said first bypass unit includes a non reciprocal polarisation rotation element interconnected to said bypass control input and wherein said output transmission unit transmits said series of channels to said output waveguide through said non reciprocal polarisation rotation element.

34. An optical add and drop multiplexer as claimed in claim 30 wherein said output transmission unit comprises a mirror for reflecting light transmitted through said first bypass unit back through said first bypass unit and towards said output waveguide.

35. An optical add and drop multiplexer as claimed in claim 30 wherein said input and output waveguide are spaced adjacent one another.

36. An optical add and drop multiplexer as claimed in claim 30 wherein said filter unit comprises a wavelength selective mirror.

37. An optical telecommunication system including at least one optical multiplexer device comprising:

a first optical input channel;

a second optical input channel;

an optical output channel;

a first series of polarization manipulation elements inconnected to said first and second input channel, said elements manipulating the polarisation state of light emitted from either said first or second input channel;

a wavelength selective filter adapted to transmit first predetermined wavelengths and reflect second predetermined wavelengths emitted from said first and second optical channel;

a second series of polarization manipulation elements for manipulating said first predetermined wavelengths;

wherein input light from said second optical input channel having third predetermined range of wavelengths is combined with light emitted from said first optical input channel at said optical output channel.

38. An optical crossbar switch for adding at least one candidate wavelength division multiplexed channel to a series of other channels, said crossbar switch comprising:

an input waveguide;

a first multiplexing channel waveguide for inputting said at least one candidate wavelength division multiplexed channel;

a first bypass unit connected to said input waveguide and having a bypass control input and projecting light emitted from said input waveguide to one of at least two spatial positions depending on the state of said bypass control input;

a filter unit located at a first one of said two spatial positions, said filter unit optically combining said candidate wavelength channel from said first multiplexing channel with said series of other channels and transmitting the resulting series channels to one of at least two spatial position depending on the state of said bypass control input; and an output waveguide located at one of said at least two spatial positions.

* * * * *